April 19, 1966  P. A. WOLFF  3,246,476
SUBMERSIBLE VESSEL FOR SUBMARINE OPERATIONS
Filed Dec. 5, 1963  8 Sheets-Sheet 1

INVENTOR
PAUL A. WOLFF
BY
Shanley & O'Neil
ATTORNEYS

April 19, 1966     P. A. WOLFF     3,246,476
SUBMERSIBLE VESSEL FOR SUBMARINE OPERATIONS
Filed Dec. 5, 1963     8 Sheets-Sheet 3

*INVENTOR*
PAUL A. WOLFF

BY    *Shanley & O'Neil*

ATTORNEYS

April 19, 1966  P. A. WOLFF  3,246,476
SUBMERSIBLE VESSEL FOR SUBMARINE OPERATIONS
Filed Dec. 5, 1963  8 Sheets-Sheet 4

FIG. 7

INVENTOR
PAUL A. WOLFF
BY Shanley & O'Neil
ATTORNEYS

April 19, 1966 P. A. WOLFF 3,246,476
SUBMERSIBLE VESSEL FOR SUBMARINE OPERATIONS
Filed Dec. 5, 1963 8 Sheets-Sheet 6

INVENTOR.
PAUL A. WOLFF
BY Shanley & O'Neil
ATTORNEYS

April 19, 1966  P. A. WOLFF  3,246,476
SUBMERSIBLE VESSEL FOR SUBMARINE OPERATIONS
Filed Dec. 5, 1963  8 Sheets-Sheet 7

INVENTOR.
PAUL A. WOLFF
BY Shanley & O'Neil
ATTORNEYS

INVENTOR.
PAUL A. WOLFF
BY Shanley & O'Neil
ATTORNEYS

United States Patent Office 3,246,476
Patented Apr. 19, 1966

3,246,476
SUBMERSIBLE VESSEL FOR SUBMARINE
OPERATIONS
Paul A. Wolff, Oklahoma City, Okla., assignor to Kerr-McGee Oil Industries, Inc., a corporation of Delaware
Filed Dec. 5, 1963, Ser. No. 328,301
17 Claims. (Cl. 61—46.5)

This application is a continuation-in-part of copending application Serial No. 30,043, filed May 12, 1960, now abandoned, which is a continuation-in-part of application Serial No. 617,127, filed October 19, 1956, now abandoned.

This invention relates to improvements in submersible vessels for submarine operations such as offshore deep well drilling operations.

A submersible vessel for submarine operations comprises a self-contained structure which is floated to a location where a drilling operation is desired to be performed and at the location is submerged below the surface of the water such as to the underlying land bottom and maintained in the submerged position during performance of the submarine operation and when the operation is completed the vessel desubmerged, such as from the land bottom, for movement to another location.

Submersible vessels must possess adequate stability during submergence and desubmergence or refloating operations and during performance of the submarine operation when the vessel is submerged to below the surface of the water such as to the underlying land bottom. Submersible vessels provided by the prior art employ buoyant pontoons or platforms which are attached to and controllably movable relative to a main structure located above the surface of the water from which the submarine operation is performed in order to maintain stability during submerging and refloating operations. Another form of prior submersible vessel incorporates an elongated base structure having columns supporting a working platform thereabove which obtains stability during submergence and refloating by submerging one end of the base structure to the land bottom while maintaining the other end floating with freeboard. Such prior submersible vessels have been built for operation in relatively shallow water such as depths up to forty to fifty feet and have been successfully used for that purpose. However, such prior submersible vessels have not been built for performing submarine operations in great depths of water due to an inherent inability to provide adequate stability during submerging and refloating operations and during performance of a submarine operation when submerged below the surface of the water. In addition, prior submersible vessels employing relatively movable pontoons or platforms do not constitute a practical design for a submersible vessel operable in great depths of water primarily because of the magnitude of forces involved between relatively movable parts, and the prior type of submersible vessel designed for one end submergence operations is unsatisfactory for deep water operation since the length of the vessel is directly related to the depths of water in which the vessel is designed to be submerged.

It is accordingly an object of the present invention to provide a novel submersible vessel of unitary construction.

Another object is to provide a submersible vessel of unitary construction which provides a high order of stability about any axis of the vessel during submergence and refloating operations.

Another object is to provide a submersible vessel of unitary construction which may be submerged and refloated with the vessel in a substantial horizontal attitude.

Another object is to provide a submersible vessel including a base structure and a working platform supported above the base structure by means including stabilizing members which function to stabilize the vessel during submergence and refloating operations.

Another object is to provide a submersible vessel of the foregoing character in which the platform, base structure and stabilizing members are rigidly joined together to form a unitary structure.

Another object is to provide a submersible vessel of the foregoing type in which submergence and refloating of the vessel is obtained by ballast being controllably added to or removed from ballast compartments of the vessel.

Still another object of the invention is to provide a submersible vessel of unitary construction which is capable of operation in great depths of water.

Still another object is to provide a submersible vessel which obtains a high order of ground stability without employing auxiliary mechanical means such as piling.

Still another object is to provide a submersible vessel which reduces to a minimum forces applied onto the vessel due to the action of waves, wind and currents when the vessel is floating, during submergence or refloating, and when submerged for performance of a submarine operation such as to the land bottom.

Still another object is to provide a submersible vessel capable of maintaining a high order of stability when submerged to perform a submarine operation.

Still another object is to provide a submersible vessel that provides a high order of stability when submerged to the land bottom.

Still another object is to provide a submersible vessel that obtains a high order of ground stability when submerged to land bottom possessing a low order of load bearing capacity.

A still further object of the present invention is to provide a novel method of operating a submersible vessel having the foregoing characteristics which obtains and maintains optimum stability of the vessel when the vessel is submerged to the land bottom.

A still further object is to provide a novel method of operating a submersible vessel which increases the load bearing capacity of the land bottom to which the vessel is submerged.

Other objects and features of the present invention will appear more fully from the following detailed description considered in connection with the accompanying drawings which disclose several embodiments of the invention. It is to be expressly understood, however, that the drawings are designed for purposes of illustration only and not as a definition of the limits of the invention, reference for the latter purpose being had to the appended claims.

In the drawings, in which similar reference characters denote similar elements throughout the several views.

Figure 1:
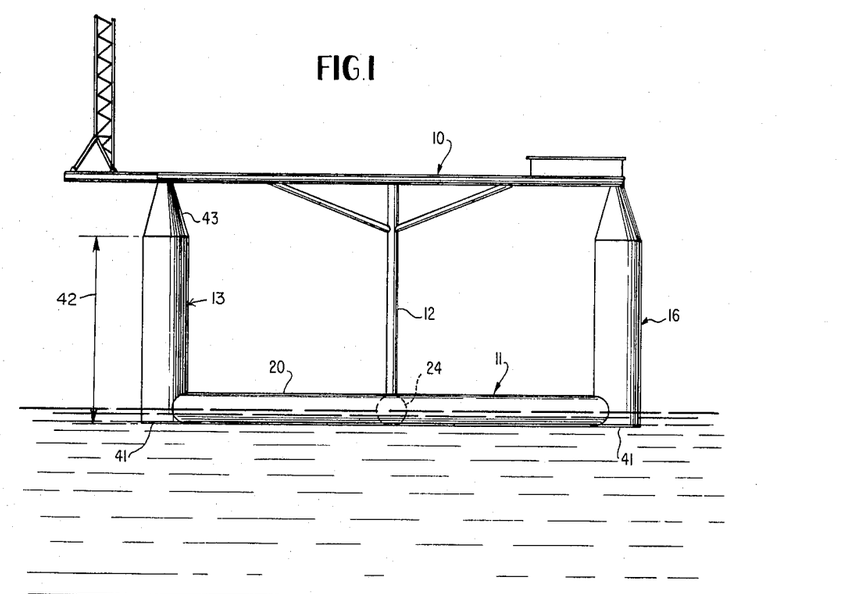
FIGURE 1 is a view in side elevation of a submersible vessel constructed in accordance with the principles of the present invention, the vessel being illustrated in floating position.
Figure 2:
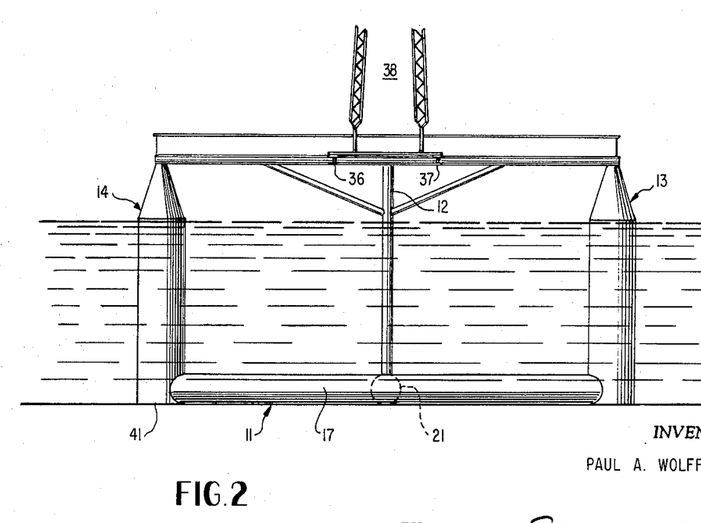
FIGURE 2 is a front elevational view of the submersible vessel shown in FIGURE 1, the vessel being illustrated submerged to the land bottom.
Figure 3:
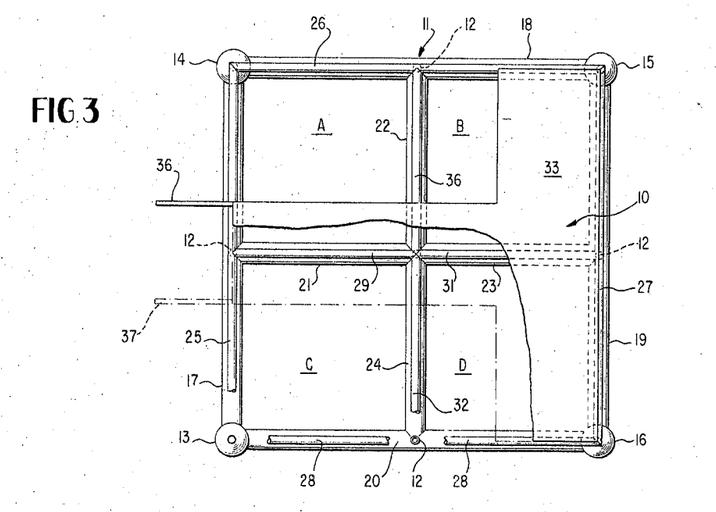
FIGURE 3 is a plan view of the submersible vessel shown in FIGURES 1 and 2, the view being of reduced scale and parts of the vessel being broken away.

With reference more particularly to FIGURES 1, 2 and 3 of the drawings, a submersible vessel constructed in accordance with the principles of the present invention is shown therein including a platform 10 supported above a base structure 11 by a plurality of columns 12 and four elongated stabilizing means 13, 14, 15, and 16. The base structure or section 11 includes four elongated hollow members 17, 18, 19, and 20 joined together at their ends to form an open frame structure. The base structure may also include a plurality of interconnected elongated hollow members 21, 22, 23, and 24 positioned within the open frame structure and connected to the elongated members 17, 18, 19, and 20 to form a lattice-type base structure. The elongated members 17, 18, 19, and 20 and the internal elongated members 21, 22, 23, and 24 are rigidly joined together and generally lie in a common horizontal plane and, if desired, may be of similar cross-sectional size and shape. This construction provides a base structure possessing the necessary outline area to provide stability of the vessel when floating as well as the necessary stability when the vessel is submerged to the land bottom with minimum use of material, and also improves the lateral stability of the vessel, in any direction, when resting on the land bottom due to the multiplicity of lateral contact areas wth the land bottom.

The upper ends of the stabilizing means 13, 14, 15, and 16 are joined together by elongated connecting members 25, 26, 27, and 28 to which the upper ends of the columns 12 may be joined. Additional structural members 29, 30, 31, and 32 may be located within the area defined by the members 25, 26, 27, and 28 and connected to the latter members in generally coplanar relationship therewith to increase the rigidity of the structure and provide a support for a deck 33. Additional columns 12 may be located between the lower internal members 21, 22, 23, and 24 and overlying upper internal members 29, 30, 31, and 32 or other deck supporting structure as required. In order to provide a vessel having a low center of gravity, the deck 33 should only be of an area and shape required for a particular submarine operation and it may not be necessary to provide a deck extending throughout the total area defined by the elongated connecting members 25, 26, 27, and 28. As shown in FIGURE 3, for submarine drilling operations, the deck 33 may be of T-shape. For the latter operation, a pair of cantilever beams 36 and 37 extend outwardly from the fore end of the vessel in symmetric relation with its fore-aft axis to provide a support for a drilling rig 38.

The stabilizing means 13, 14, 15, and 16 function to support the platform 10 above the base structure 11, to stabilize the vessel during its submergence and refloating operations in a manner described below, and as means for controlling ballast to establish the desired bottom reaction and also in some cases to aid in controlling submergence and refloating of the vessel. The lower end portions of the stabilizing means joined to the elongated members 17, 18, 19, and 20 may be considered as being parts of the base section and the base section provides sufficient displacement to buoyantly support the vessel while maintaining the base section with freeboard as shown in FIGURE 1. The stabilizing means as shown include vertically disposed elongated hollow cylindrical members having their lower ends closed by end plates 41. In the embodiment of FIGURES 1, 2 and 3, the major portion 42 of the height of the stabilizing means extending upwardly from the base section is of substantially constant diameter to provide a cross-sectional outline defining a substantially uniform area throughout such height which comprises the effective height of the stabilizing means and determines the maximum depth of water in which the vessel is submersible. The remaining portion 43 of the stabilizing means provides wave clearance beneath the platform when the vessel is submerged in the maximum depth of water and is of reduced cross-sectional area to minimize wave action influence upon the vessel. The upper portions 43 of the stabilizing means are shown as erect conical structures which provide an efficient means for reducing the relatively large cross-sectional area while providing structural stability.

The elongated hollow members forming the base structure or section and the stabilizing means 13, 14, 15, and 16 are preferably of non-rectangular cross-section, such as elliptical, semi-elliptical, or circular cross-section. Members of non-rectangular cross-section are desired since the vessel is subject to hydrostatic pressures. Such members are shown in the form of hollow cylindrical members which may be fabricated from steel plates formed into cylindrical shape and welded together in end-to-end relation to provide members of the required length and the members are joined together by water-tight joints, preferably by welds, to form a rigid base structure. The elongated hollow members of the base structure are provided with spaced bulkheads (not shown) to segregate the members into a plurality of water-tight ballast compartments. Centrifugal and ejector pumps and suitable conduits (not shown) are provided for controlling ballast in the compartments. The stabilizing members are also preferably formed to provide water-tight compartments and provided with centrifugal or ejector pumps and suitable conduits for controlling ballast therein.

The base section, that is the structure including members 17, 18, 19, 20, 21, 22, 23, and 24 and the lower end portions of the stabilizing means 13, 14, 15, and 16, is designed to displace a volume of water, in accordance with the total mass of the vessel, including the dead weight comprising equipment and supplies required for a submarine operation, to buoyantly support the vessel with the base structure having freeboard as shown in FIGURE 1 when the compartments of the base structure and the stabilizing means are properly de-ballasted. The area defined by the cross-sectional outline of the base section is related to the total mass of the vessel and the location of its center of gravity which is determined in part by the effective height of the stabilizing means to locate the metacenter of the vessel above its center of gravity and thereby stabilize the vessel when floating with the base structure having freeboard. However, the fore-aft and the transverse dimensions of the base structure are not established by the stability requirements of the vessel when buoyantly supported in the manner shown in FIGURE 1, but these dimensions of the base structure are primarily determined by the necessary distances between the stabilizing means measured along the sides of the base structure to provide stability of the vessel during submergence and refloating operations. The dimensions of the base structure are also determined by the section modulus of the base structure required for ground stability and, in some cases, the peripheral dimensions of the base structure may be different from the stabilizing pattern presented by the stabilizing means. Upon the introduction of sufficient ballast to the compartments of the base structure to submerge the base structure below the surface of the water and throughout a depth of water corresponding to the effective height of the stabilizing means to the land bottom as shown in FIGURE 2, and during refloating operations, the stabilizing means 13, 14, 15, and 16 function to provide vertical stability of the vessel. Thus, the displacement of the base structure and the displacement of the stabilizing means are sufficient to buoyantly support the vessel upon submergence of the base structure throughout a depth of water corresponding to the effective height of the stabilizing means. Inasmuch as the vessel, when not considering buoyance of the stabilizing means, may be maintaind in a slightly negative buoyant condition upon submergence of the base structure, the total displacement presented by the stabilizing means need only comprise a small proportion of the total displacement of the base structure in order to provide vertical stability of the vessel upon submergence of the base structure.

As mentioned above, the stabilizing means also functions, upon submergence of the base structure, to stabilize the vessel upon heeling about the fore-aft axis, the transverse axis or any intermediate or diagonal axis. This is accomplished by proportioning the area defined by the cross-sectional outline of the stabilizing means and the distance between the stabilizing means measured along the sides of the stabilizing pattern to develop moments of inertia of the water plane areas of the stabilizing means about any axis of heel of the vessel of magnitudes to establish the metacentric height of the vessel with respect to the axis of heel above the center of gravity of the vessel upon submergence of the base structure. The area defined by the cross-sectional outline of the stabilizing means throughout their effective height 42 is determined in accordance with the distance between the stabilizing means measured along the sides of the stabilizing pattern to develop moments of inertia of the magnitude required for the desired order of stability. The distance between the stabilizing means depends upon various dependent or independent factors including economic considerations such as required material and fabrication and construction costs.

As discussed above, in addition to the requirement of providing stability of submersible vessels while floating as shown in FIGURE 1, or during submergence and refloating of the base structure, it is necessary to provide proper stability when the vessel is submerged to the land bottom in order to permit extended submarine operations such as a drilling operation. Vertical ground stability is normally achieved by controlling the degree of negative buoyance of the vessel so that a major portion of the total mass of the vessel is supported by buoyancy rather than by bottom reaction. A novel and preferred operational feature of the present invention is to maintain symmetrical loading on the soil by adjusting the vessel load and/or buoyancy to achieve uniform or substantially uniform bottom loading on the base portion rather than a controlled negative buoyant. The displacement requirements of the base structure and the stabilizing means for submergence and refloating stability are also adequate for this purpose. However, in order to provide a stable foundation, a definite relationship must exist between the horizontal outline area defined by the members 17, 18, 19, and 20 of the base structure and the vertical distance between the base structure and the working platform, while also considering the type of submarine operation for which the vessel is designed and the mass of the required equipment. If the side dimensions of the polygonal base structure are considered as comprising the minimum permissible distance between the stabilizing means, the diameter of the hollow members forming the base structure may be determined to provide the required displacement and the diameters of the stabilizing means may be calculated to provide areas of the cross-sectional outline of the stabilizing means throughout their effective height sufficient to develop moments of inertia of the water plane areas having the magnitude required for the desired order of stability. The present invention is not limited to a construction in which the side dimensions of the base structure are of the exact dimensions required to provide adequate ground stability since it may be economical in some cases to provide a vessel nicluding a base structure having smaller side dimensions and including other means for obtaining the required ground stability such as anchors or piling. Furthermore, the side dimensions of the base structure may be in excess of that required for adequate ground stability in order to decrease the diameter of the hollow cylindrical members forming the base portion as well as the area defined by the cross-sectional outline of the effective height of the stabilizing means.

When it is desired to submerge the vessel, sufficient ballast is selectively added to the compartments of the base structure to submerge the base structure below the surface of the water. At the instant the base structure loses freeboard, vertical stability of the vessel and stability of the vessel about any axis of heel are obtained by the stabilizing means 13, 14, 15, and 16. Since the effective height of the stabilizing means corresponds to the maximum depth of water in which the vessel is submersible, all phases of stability will be maintained throughout submergence of the base structure to the land bottom as shown in FIGURE 2. As the buoyance presented by the stabilizing means increases upon continued submergence of the base structure below the surface of the water, it is necessary to controllably add ballast continuously to the compartments throughout submergence of the vessel. In some cases, as noted above, it may be necessary to add ballast to the stabilizing means to control or complete the submergence of the vessel. Upon submergence of the base structure to the land bottom, ballast is regulared to establish the desired bottom reaction and, as noted above, it may be convenient to controllably add ballast to the stabilizing means for this purpose. When it is desired to refloat the vessel, ballast that may have been added to the stabilizing means is first removed and then ballast is selectively removed from the compartments of the base structure to render the vessel buoyant. Thereafter, the vessel may be refloated in accordance with the rate of ballast removal from the compartments of the base structure. The vessel may be submerged and refloated while maintaining the base structure substantially horizontally disposed and may be refloated by first rendering buoyant only one end of the vessel. Also, the vessel may be moved from one location to another with the base structure submerged.

The submersible vessel means shown in FIGURES 1, 2 and 3 includes stabilizing means 13, 14, 15, and 16 located at the corners of a substantial square presenting a substantially square polygonal stabilizing pattern. Also, the elongated members 17, 18, 19, and 20 forming the sides of the base structure are of substantially equal length. With this construction, the moments of inertia of the water plane areas of the stabilizing means throughout their effective height about any axis of heel are substantially equal so that the metacentric height of the vessel, irrespective of the axis of heel, is substantially equal and maximum inherent stability, during submergence and refloating, is obtained for a given periphery.

Figure 4:
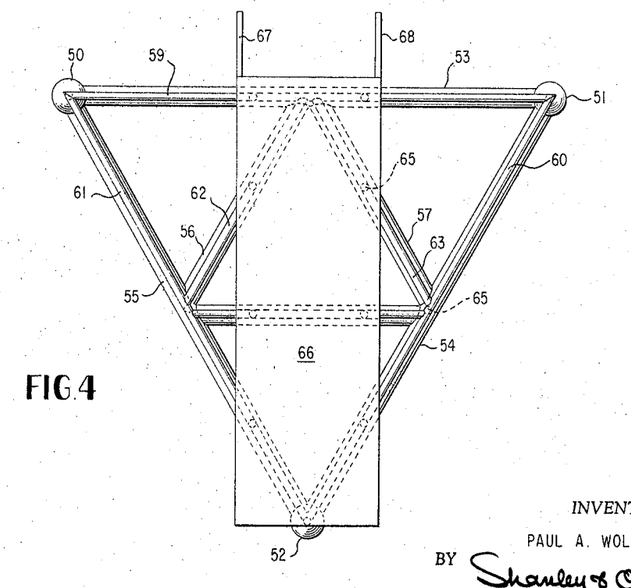
FIGURE 4 is a plan view of a submersible vessel constructed in accordance with another embodiment of the present invention.

In FIGURE 4 of the drawings, a submersible vessel is shown in which the substantial polygonal stabilization pattern is in the form of a triangle. As shown, the vessel includes three stabilizing means 50, 51 and 52, which may be similar to the stabilizing means shown in FIGURES 1, 2 and 3, connected at their bottoms to a base structure including hollow elongated side members 53, 54 and 55. The base structure is of the lattice type including internal members 56, 57 and 58 connected in the form of a triangle, the apices of which are joined to mid-points of the members 53, 54 and 55. The upper ends of the stabilizing means 50, 51 and 52 are connected by elongated side members 59, 60 and 61 which may be interconnected by an internal triangular structure comprised of members 62, 63, 64. Auxiliary columns 65, corresponding to columns 12 of FIGURES 1, 2 and 3, may be provided between the base structure and corresponding portions of the upper structure as required. A deck 66 is supported on the upper structure and cantilever beams 67 and 68 may extend outwardly from one side of the vessel for supporting apparatus for performing a submarine operation (not shown).

The diameters of the stabilizing means 50, 51 and 52 are proportioned relative to the dimensions of the sides of the stabilizing pattern in accordance with factors which affect stability as discussed above so as to provide the required order of stability of the vessel during submergence and refloating operations. In addition, the outline area of the base structure is dimensioned to provide a section modulus of the required order to provide high stability against overturning when the vessel is submerged to the ground. Also, as in the embodiment of FIGURES 1, 2 and 3, the base structure provides sufficient displacement to buoyantly support the vessel when the compartments of the base structure and the stabilizing means are deballasted, and the base structure and the stabilizing means are compartmented and suitable pumps and conduits are provided for controlling the ballast of the vessel. The vessel is submerged and refloated in a manner similar to the vessel of FIGURES 1, 2 and 3, described above.

Figure 5:
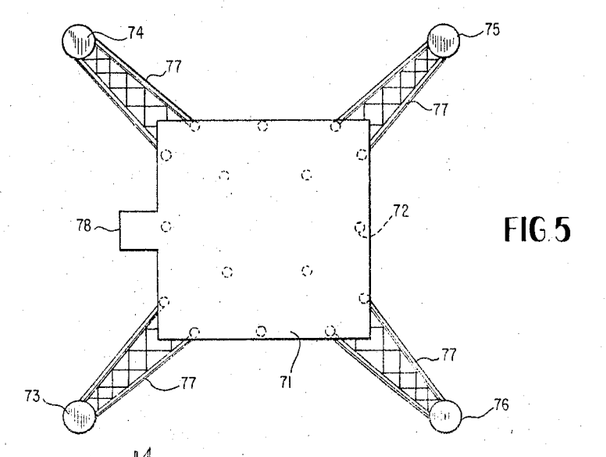
FIGURE 5 is a plan view of a submersible vessel constructed in accordance with still another embodiment of the present invention.
Figure 6:
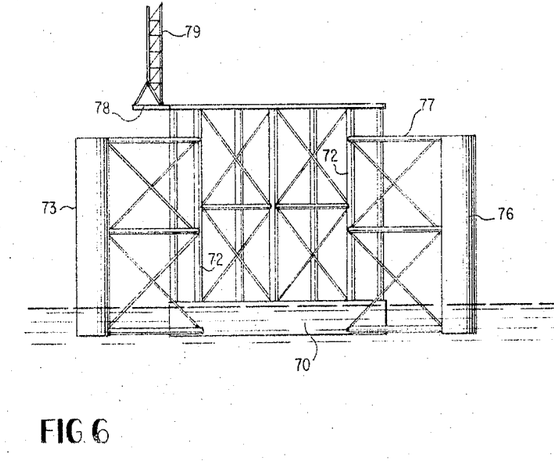
FIGURE 6 is an elevational view of the submersible vessel shown in FIGURE 5.

The principles of the present invention may be incorporated in a submersible vessel in which the stabilizing means does not function to support the working platform and in which the base structure does not extend throughout the distance between the stabilizing means, that is, does not correspond to the stabilizing pattern. As shown in FIGURES 5 and 6, a submersible vessel according to the present invention may comprise a main structure including a rectangular compartmented continuous surface base structure 70 having a working platform 71 supported above the base structure by an open frame structure including supporting columns 72. Four elongated stabilizing means, in the form of vertically disposed hollow cylindrical members 73, 74, 75, and 76 having closed bottom ends, are rigidly attached to the main structure and are positioned with respect to each other to define the corners of a substantial polygonal stabilizing pattern of rectangular shape. The stabilizing members may extend substantially throughout the depth of the base structure and upwardly at least a distance corresponding to the maximum depth of water in which the vessel is submersible. The stabilizing members are rigidly connected to the main structure by means of outrigger frames 77 so that the stabilizing pattern is greater than the fore-aft and transverse dimensions of the base structure 70. A cantilever structure 78 may be located at one side of the platform 71 for supporting a drilling rig 79 or other equipment for performing a submarine operation. In this embodiment of the invention, the base structure presents a total displacement, which may include the displacement of the lower ends of the stabilizing means, sufficient to buoyantly support the vessel. When the vessel is floating with the base structure having freeboard and when the base structure is without freeboard during submergence and refloating, stability of the vessel about any axis of heel is obtained by the stabilizing means and for this purpose the distance between the stabilizing means and the area defined by the cross-sectional outline of the stabilizing means are proportioned in the manner discussed above to at all times maintain the metacentric height of the vessel sufficiently above the center of gravity of the vessel to provide a high order of stability. This embodiment of the invention makes it possible to economically provide a highly stable submersible vessel including a compartmented base structure of the continuous surface type having a relatively small outline area.

Figure 7:
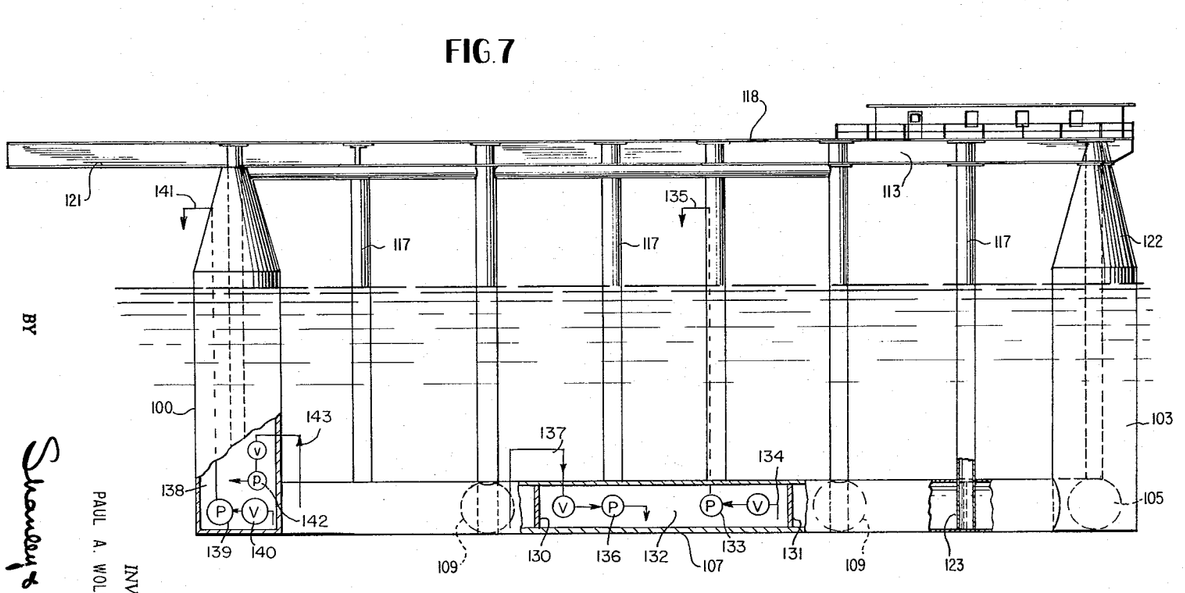
FIGURE 7 is a side elevational view of a submersible vessel constructed in accordance with still another embodiment of the present invention.
Figure 8:
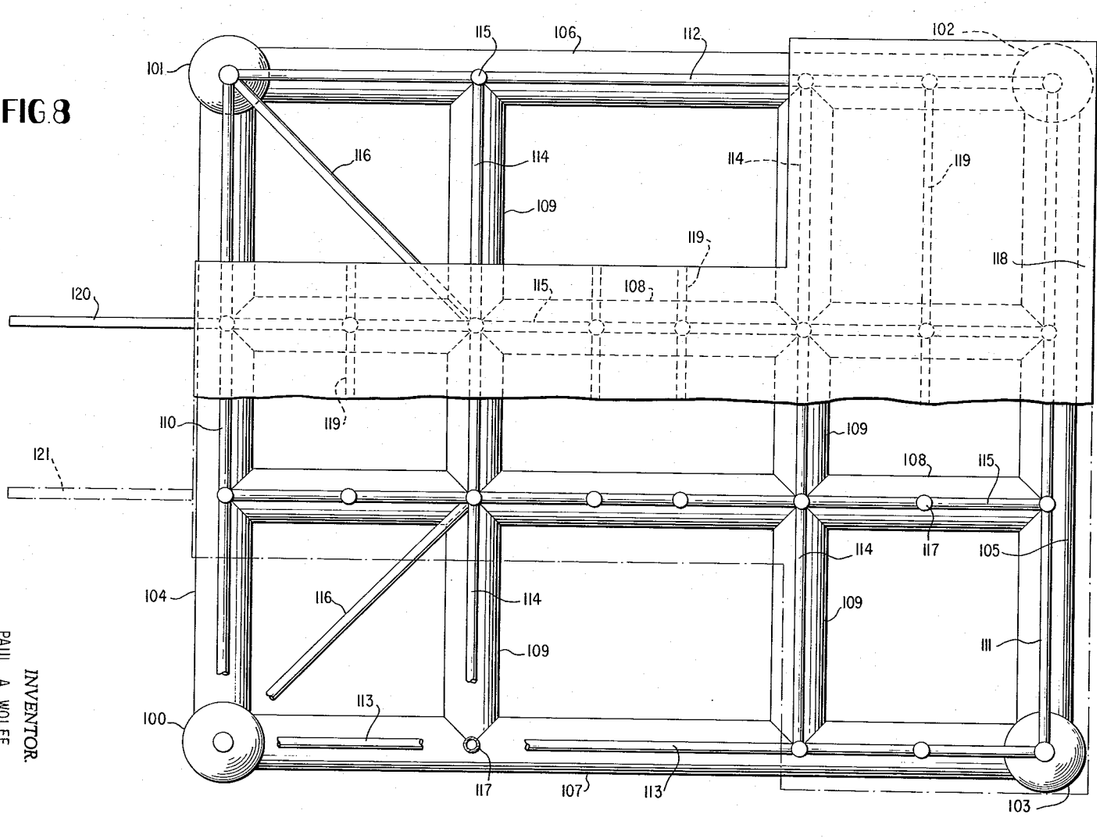
FIGURE 8 is a plan view of the submersible vessel shown in FIGURE 7 with parts of the vessel being broken away.

The embodiment shown in FIGURES 7 and 8 of the drawings incorporates the principles of the present invention in a submersible vessel designed for one-end-down submergence and one-end-up refloating operations. As shown, the vessel includes four vertically disposed elongated stabilizing means 100, 101, 102, and 103 located at the corners of a rectangle to provide a substantial polygonal stabilization pattern of rectangular shape. The base structure has an outline area corresponding to the stabilizing pattern and includes transverse end members 104 and 105 and longitudinal side members 106 and 107. The base structure is of the lattice type including internal interconnected longitudinal members 108 and transverse members 109 forming a coplanar grid-type structure. The upper ends of the stabilizing members 100, 101, 102, and 103 are interconnected by transverse end members 110 and 111 and by longitudinal side members 112 and 113 and such transverse and longitudinal members may be interconnected by internal transverse members 114 and internal longitudinal members 115 as well as diagonal members 116. Columns 117 may be provided between the base structure and corresponding portions of the upper structure as required for structural stability and support for a deck 118 which may be of T-shape. Deck supporting members 119 may be provided as required and cantilever beams 120 and 121 may extend outwardly from one end of the vessel to support drilling equipment, not shown, in a manner similar to the arrangement shown in FIGURES 1, 2 and 3. The stabilizing members 100, 101, 102, and 103 terminate in conical upper portions 122 and the columns 117 may extend into and be joined to members of the base structure, such as shown at 123 of FIGURE 7, to provide a rigid structure. The diameters of the stabilizing members and the length of the members forming the base structure between the stabilizing members are established in the manner discussed above in connection with the embodiments of FIGURES 1, 2 and 3.

A vessel constructed in accordance with the embodiment of the invention shown in FIGURES 9 through 12 includes a base structure made up of hollow cylindrical members approximately 16 feet in diameter, and having a fore-aft dimension of approximately 240 feet and a transverse dimension of approximately 200 to 220 feet. The four hollow cylindrical stabilizing members are of a diameter of about 22 feet and have a total height of about 100 feet and an effective height of approximately 75 feet. The supporting columns comprise hollow cylindrical members of about three and one-half feet in diameter.

The submersible vessel shown in FIGURES 9, 10, 11 and 12 of the drawings includes a plurality of vertically disposed stabilizing means located at the corners of a substantially polygonal stabilizing pattern which function to support a platform above a base structure, to provide stability of the vessel during submergence and refloating operations in a manner similar to the function of the stabilizing means of the previously described embodiments, in combination with novel features which improve the stability of the vessel when submerged to the land bottom and obtains a high order of ground stability for vessels of great mass designed for submergence in great depths of water even at locations where the land bottom is incapable of providing a rigid foundation from which a submarine operation may be performed.

Figure 11:
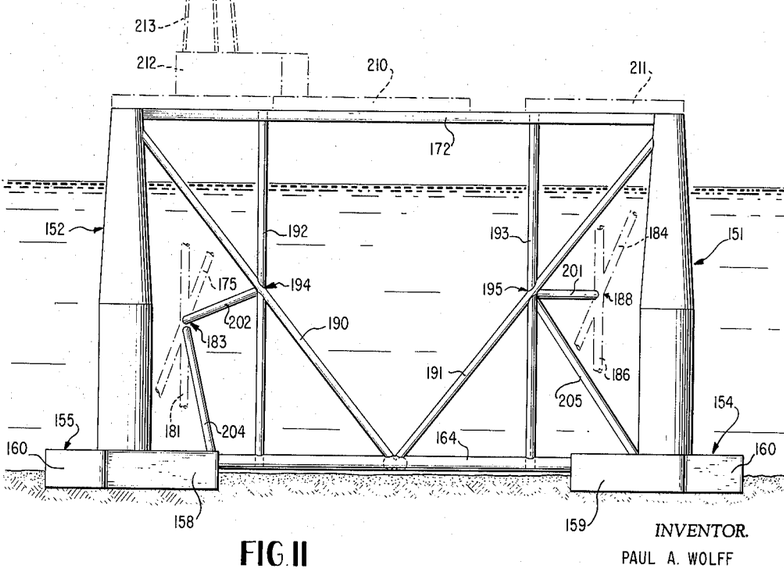
FIGURE 11 is a view in side elevation of the submersible vessel shown in FIGURE 9 as seen from point B of FIGURE 9.
Figure 12:
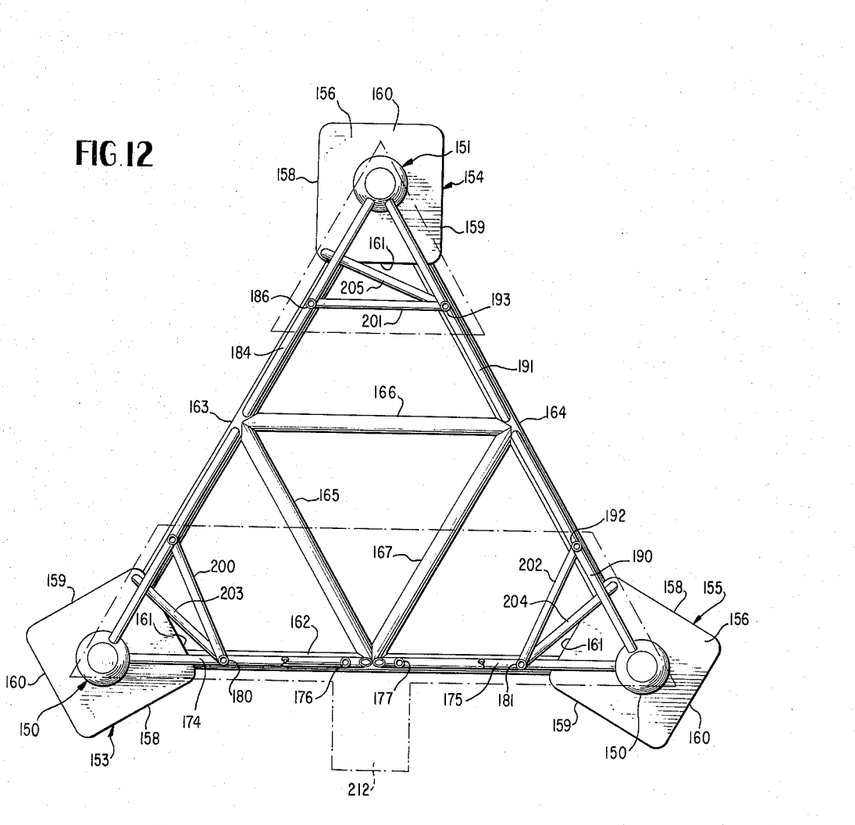
FIGURE 12 is a view in plan of the submersible vessel shown in FIGURE 9 with parts of the vessel removed.
Figure 13:
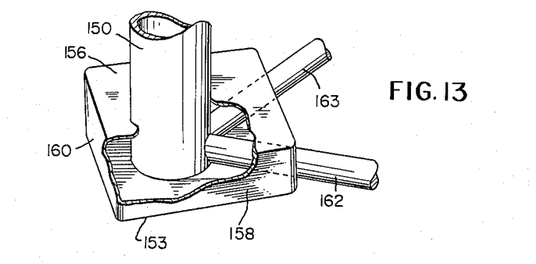
FIGURE 13 is a three-dimensional view with parts broken away of a detail of the submersible vessel shown in FIGURE 9.

As shown, the submersible vessel includes three stabilizing columns 150, 151 and 152 located at the corners of a polygonal stabilizing pattern of triangular shape. At the bottom of each stabilizing member 150, 151 and 152, there is secured a footing 153, 154 and 155, respectively. The footings 153, 154 and 155 comprise hollow water-tight compartments including continuous top and bottom surfaces 156 and 157, respectively, and continuous side walls 158, 159, 160, and 161. The top and bottom surfaces are substantially perpendicular to the vertical axes of respective stabilizing members and the continuous side walls 158, 159, 160, and 161 are substantially perpendicular to the top and bottom surfaces, the side walls of the compartment at the corners being curved as shown, if desired. The top and bottom surfaces of the footings are of an area substantially greater than the area of the stabilizing members and the side walls of the compartments are of substantial depth as illustrated in the drawings for reasons discussed below. The footings are preferably of rectangular shape, as viewed in plan, and are preferably orientated with their long dimension extending along radial lines passing through the center of the stabilizing pattern and the vertical axis of respective stabilizing members and, as seen in FIGURE 12, the footings are symmetrically positioned with respect to such radial lines and the stabilizing members are displaced outwardly from the central areas of the upper surfaces of the footings. The footings 153, 154 and 155 lie in a common horizontal plane and are rigidly joined together by a lower structure including elongated members 162, 163 and 164 which form the sides of a triangular structure including the footings 153, 154 and 155 generally located at the apices. The ends of the elongated members 162, 163 and 164 preferably extend through the side walls 161 of the footings and into the footings and there may be joined with an adjacent elongated member and with the stabilizing member to provide a rigid construction as shown in FIGURE 13. An inner triangular structure formed by members 165, 166 and 167 is located within the triangular structure formed by the members 162, 163 and 164 with the apices of the inner triangular structure being connected to the mid-points of the latter members to provide a lower structure of high rigidity. The members forming the inner and outer triangular structures are preferably of tubular construction and may be compartmented for receiving water ballast. As shown more clearly in FIGURES 10 and 11, the elongated members 162, 163 and 164 have a diameter or vertical dimension, as viewed in the drawing, substantially less than half the depth of the footings 153, 154 and 155 and are joined to the side walls 161 close or adjacent to the top surface of the footings so that a major portion of the depth of the side walls 161 lies below the lower surfaces of the members 162, 163 and 164. The purpose of this construction will be described below.

The upper ends of the stabilizing members 150, 152 and 153 are joined by an upper structure including elongated members 170, 171 and 172 which form the sides of a triangular structure including the upper ends of the stabilizing members generally located at the apices. The elongated members 170, 171 and 172 lie in a common horizontal plane parallel to the plane of the lower triangular structure and are located generally above the elongated members 162, 163 and 164, respectively, and the stabilizing members are substantially perpendicular to such planes. Corresponding upper and lower elongated members on each side of the vessel are interconnected and joined to pairs of the stabilizing members to form a truss structure. The truss structure including stabilizing members 150–151 is shown in FIGURE 10, the truss structure including stabilizing members 151–152 is shown in FIGURE 11, while the truss structure including the stabilizing members 150–152 is shown in FIGURE 9.

Figure 9:
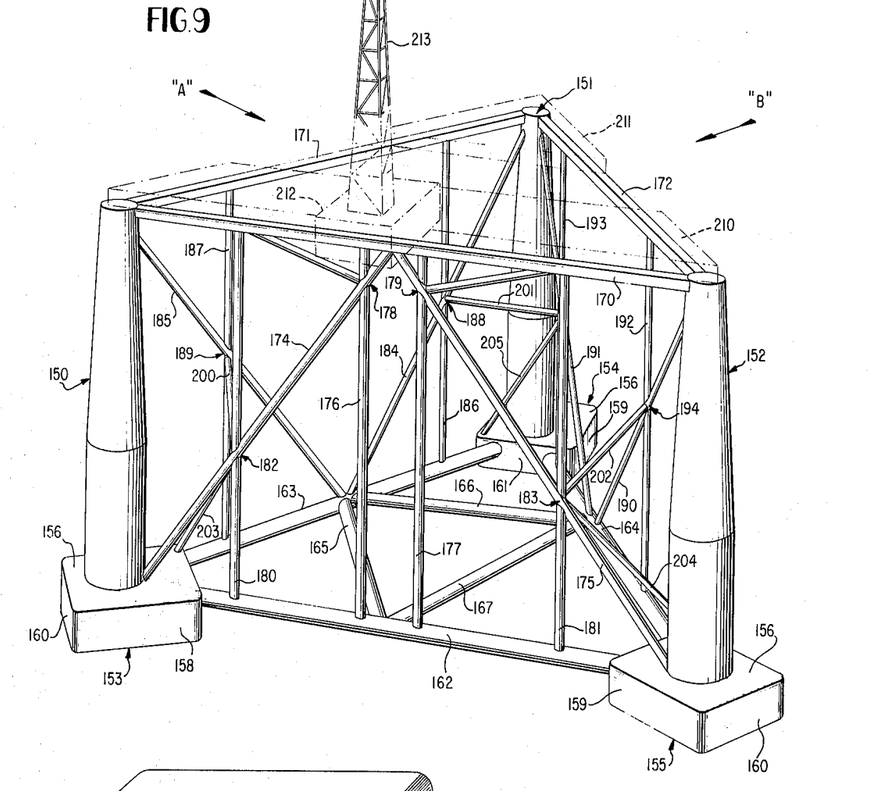
FIGURE 9 is a three-dimensional view of a submersible vessel constructed in accordance with a further embodiment of the present invention.

The truss structure shown in FIGURE 9 includes a pair of diagonal members 174 and 175 positioned generally in the plane of the members 162 and 170 with their lower ends joined to the base of the stabilizing members 150 and 152, respectively, and with their upper ends joined in contiguous relationship to the upper member 170 at a region intermediate its length. A pair of spaced vertical columns 176 and 177 are located generally beneath drilling equipment supporting structure described below and extend between the lower member 162 and the upper member 170 and are joined at regions 178 and 179 to the diagonal members 174 and 175, respectively. In addition, vertical columns 180 and 181 are spaced from the stabilizing members 150 and 152, respectively, and are connected between the lower member 162 and the upper member 170 and are joined at regions 182 and 183 to the diagonal members 174 and 175, respectively. The truss structure shown in FIGURE 10 includes diagonal members 184 and 185 connected at their lower ends to a region of the mid-point of the lower member 163 and connected at their upper ends to respective stabilizing columns 151 and 152 adjacent their upper ends. Vertical columns 186 and 187 are connected between the lower member 163 and the upper member 171 and are joined at regions 188 and 189 to the diagonal members 184 and 185, respectively. The other truss structure, shown in FIGURE 11, is substantially similar to the truss structure of FIGURE 10 including diagonal members 190 and 191 connected between the lower member 164 and the upper ends of stabilizing members 152 and 153 and vertical columns 192 and 193 between the upper and lower members 172 and 164 and connected at regions 194 and 195 to the diagonal members 190 and 191, respectively. Adjacent truss structures are interconnected by transverse members joined to the diagonal members and the vertical columns of the truss structures; the truss structures of FIGURES 9 and 10 are joined by transverse member 200 connected between regions 182 and 189; the truss structures of FIGURES 10 and 11 are joined by transverse member 201 connected between regions 188 and 195; and, the truss structures of FIGURES 9 and 11 are joined by transverse member 202 connected between regions 183 and 194. In addition, the truss structures are connected by diagonal members to a footing at its side which lies generally in the plane of an adjacent truss structure. In particular, the truss structure including the members 162 and 170 is connected by diagonal members 203 and 204 to adjacent the sides of the footings 153 and 155, respectively, which lie generally in the planes of the truss structures of FIGURES 10 and 11, respectively, the upper end of the member 203 being connected to point 182 and the upper end of the member 204 being connected to the region 183. Also, diagonal member 205 is connected at its lower end to the footing 154 adjacent its side located generally in the plane of the truss structure of FIGURE 10 and is connected at its upper end to region 195 of the truss structure of FIGURE 11. The upper structural members 170, 171 and 172 are adapted to support any required platform structure such as shown in dotted lines 210 and 211 and any necessary substructure may be provided as required. A cantilever structure 212 for supporting equipment for performing a submarine operation, such as a drilling rig 213, extends outwardly from one side of the vessel such as the side including the truss structure incorporating the members 162 and 170, as shown in FIGURE 12. As noted above, the columns 176 and 177 are located beneath the cantilever structure.

Figure 10:
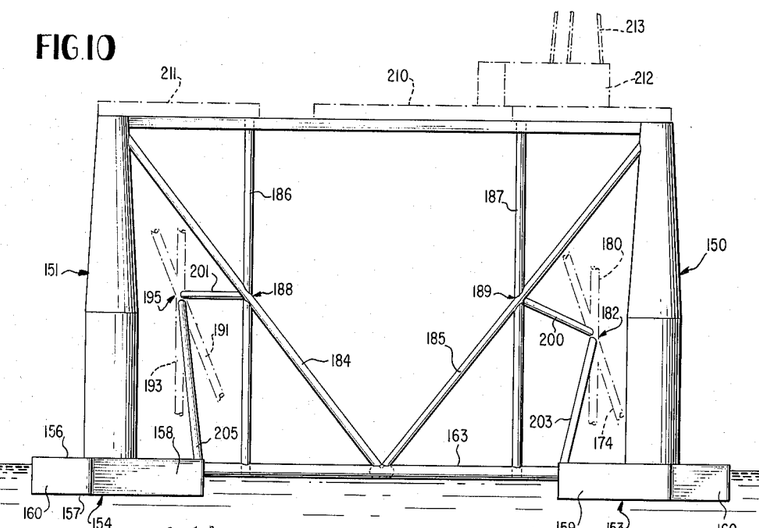
FIGURE 10 is a view in side elevation of the submersible vessel shown in FIGURE 9 as seen from point A of FIGURE 9.

In FIGURE 10 of the drawings, the vessel is shown in its normal floating position on the surface of a body of water with the footings 153, 154 and 155 having freeboard. When in normal floating position, the vessel is supported primarily by the buoyancy of the footings 153, 154 and 155 and it may be desirable that the footings displace a volume of water sufficient to buoyantly support the vessel with the footings having freeboard. The water plane area of the footings and the distance of the footings from the centroid of the vessel or from each other measured along the sides of the triangular structure are such that the moments of inertia of the water plane areas are of a magnitude to provide a high order of floating stability. The provision of footings at the corners of a stabilizing pattern of substantial polygonal shape connected by members 162, 163 and 164 of relatively small cross-sectional area make it possible to obtain a high order of floating stability with minimum adverse influence due to wave action. The footings, although comprising structures of relatively great cross-sectional area, are spaced from each other by distances which minimize the effect of wave action upon the vessel. This type of construction has particular utility in vessels designed for submergence in great depths of water which necessarily requires a base structure having a large outline area.

When it is desired to submerge the vessel, ballast is added to the compartments of the footings and to the compartments of the members 162, 163, 164, 165, 166, and 167 of the base structure if provided, to submerge the footings to below the surface of the water. When the footings lose freeboard, stability of the vessel is maintained by action of the stabilizing members 150, 151 and 152 in a manner similar to the submersible vessels described above and, accordingly, the stabilizing members are designed to present water plane areas and are spaced proper distances from the centroid of the vessel or from each other measured along the sides of the vessel so that moments of inertia of the water plane areas are of magnitudes to maintain the metacenter of the vessel a sufficient distance above the center of gravity and provide a high order of stability. Ballast is continuously added to control submergence of the vessel to the land bottom in a manner described above in connection with the previously described embodiments.

Figure 9A:
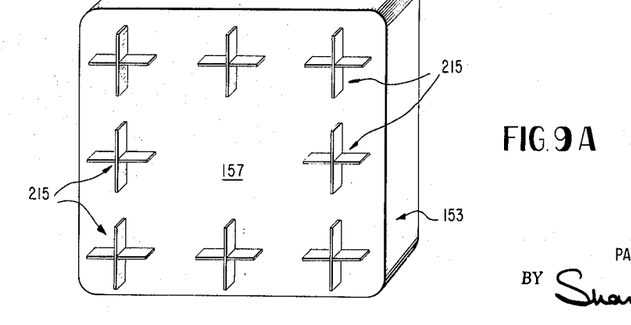
FIGURE 9A is a detailed view of a modification of the submersible vessel shown in FIGURE 9.

The position of the vessel on the land bottom is illustrated in FIGURE 11 of the drawings. As shown, the vessel when submerged to the land bottom is supported by contact between the footings 153, 154 and 155 and the land bottom without contact between the land bottom and other parts of the base structure, i.e., the members 162, 163, 164, 165, 166, and 167. Also, as seen from FIGURE 11, the bottom surface of the footings do not rest on the surface of the land bottom but are received in a socket formed in the land bottom so that the bottom surfaces of the footings contact the land bottom below the surface of the land bottom and so that the side walls of the footings below the members 162, 163 and 164 are in contact with material of the land bottom. The vertical area of contact between the side walls of the footings and the land bottom obtains lateral stability of the vessel. A plurality of vertically disposed downwardly projecting flanges may be secured to the bottom surfaces of the footings to increase the area of vertical contact between the footings and the ground bottom. As shown in FIGURE 9A, the downwardly projecting flanges may comprise cross-like structures 215 each laterally spaced from the others. It may be desirable to provide such flanges on the port and starboard footings 153 and 155 only and not on the aft footing 154 to permit some degree of skidability of the latter footing when it is desired to move the vessel from location or to accurately position the vessel on location prior to a submarine operation.

The relative positions of the footings is seen from FIGURE 12 which is a plan view of FIGURE 9 with upper structural members 170, 171 and 172 removed. The footings 153, 154 and 155 are spaced from each other or from the centroid of the vessel so that the section modulus of the pattern of the footings provides adaquate stability of the vessel when on the land bottom with respect to overturning moments which are caused by wave action, currents and wind which reach maximum values during hurricane conditions. The required section modulus of the pattern of the footings and the required areas of the stabilizing members are interrelated since the surface area of the stabilizing members determines the magnitude of overturning moments due to wave action, currents and wind, and an optimum relationship exists between spacing of the footings and the water plane area of the stabilizing members for lowest possible construction costs.

A number of factors influence the stability of a submersible vessel when submerged to the land bottom. Such factors include physical characteristics of the vessel such as the mass of the vessel including ballast, the depth of water in which it is submerged and the section modulus of the outline area of the part of the vessel in contact with the land bottom, as well as factors unrelated to the vessel itself such as physical properties of the land bottom including its vertical load bearing strength and its horizontal shear strength and the magnitude of forces that may be applied to the vessel due to wave action, wind and currents. When a vessel is submerged to the land bottom, the reactions between the vessel and the land bottom result from static vertical loading of the vesssel, cyclic vertical loads and cylic horizontal shear forces. Static vertical loading of the vessel comprises the combined mass of the vessel and its equipment and ballast less the buoyancy equal to the displacement of the portion of the vessel that is submerged while cyclic vertical loads and cyclic horizontal shear forces are developed from forces applied to the vessel by wind, currents and wave action. Cyclic vertical loads are also developed during performance of the submarine operation. The cyclic vertical loads due to the action of wind, currents and waves are plus and minus quantities varying in a generally sinusoidal manner which add to or substract from the static vertical load. Cyclic vertical loading thus presents two problems with respect to ground stability of a submersible vessel. First, the negative cyclic loading must never be equal to or greater than and preferably never approach the static vertical loading for otherwise the submersible vessel would tend to rock or could be overturned. Second, the static vertical loading plus positive cyclic loading must never exceed the maximum load bearing strength of the underlying land bottom for otherwise the vessel would lose vertical stability. In addition, the contact between the vessel and the land bottom must be capable of resisting cyclic horizontal shear forces which are developed as a consequence of cyclic loading.

In order to obtain the highest order of ground stability with respect to moments tending to overturn the vessel, the vertical static loading of the vessel should be as great as possible. The maximum static loading of a submersible vessel is attained when all available ballast compartments are filled with water. In submersible vessels of the type provided by the present invention, the stabilizing members comprise a major portion of the available volume for receiving ballast and the submersible vessel disclosed in FIGURES 9–12 includes novel features which make it possible to utilize completely the available ballast volume of the stabilizing members and thereby obtain maximum static loading of the vessel. Of course, the bearing strength of the land bottom may place a limitation on the static loading at some value below the maximum static loading that could be obtained by completely ballasting the stabilizing members; however, for the most part, land bottoms frequently possess high bearing strength so as not to place a limitation on the static loading of the vessel. Submersible vessels that are not capable of utilizing completely the ballast volume of the stabilizing members present problems with respect to lateral stability when submerged to land bottom possessing high bearing strength and one of the advantages of the concept of developing maximum static loading of the vessel comprises an improvement in lateral stability under such circumstances.

The above-mentioned novel feature of the submersible vessel shown in FIGURES 9, 10, 11, and 12 includes the concept of employing the footings 153, 154 and 155 in combination with the vertical stabilizing members 150, 151 and 152 located on top of respective footings. With this construction, the stabilizing members 150, 151 and 152 may be completely filled with water ballast and the resulting forces are applied through respective footings to the land bottom without overstressing the structure which interconnects the footings and the stabilizing members. The footings are designed to support the total force applied thereto by respective stabilizing members and to transfer such force to the land bottom in contact with the bottom surfaces of the footings. The footings and respective stabilizing members are designed to function as independent force producing and transmitting means; the members 162, 163 and 164 and the side trusses including such members are not stressed in any appreciable degree due to vertical loads applied to and through the footings by the stabilizing members. The advantages of this novel structure will be appreciated more fully by considering a submersible vessel as shown in FIGURES 7 and 8 including stabilizing members at the corners of a base structure of the lattice type which is designed for the total vertical loading substantially to be distributed uniformly throughout the area of the base structure in contact with the land bottom and thus provide a relatively low loading per square foot of contact area. Thus, a vessel of the type shown in FIGURES 7 and 8 is not designed for operation with the total or a major portion of the available volume of the stabilizing members filled with ballast and structural failure would occur should the vessel be operated in that manner. The latter will be readily understood by considering a vessel in which the stabilizing members are spaced from each other by distances of 200 feet and each stabilizing member has a volume sufficient to contain a quantity of water ballast weighing over 1000 tons. Since elements of the base structure between the stabilizing members are in contact with the ground bottom, the application of high loads to the corners of the lattice-type base structure would result in structural failure. The structural limitations on ballasting the stabilizing members of submersible vessels employing lattice-type base structures is more pronounced in submersible vessels designed for operation in great depths of water since the side dimensions of the outline area of the base structure and the available ballasting volume of the stabilizing members increase as the depth of operation of the vessel increases.

The concept of footings and stabilizing members as independent force producing and transmitting means and of providing a structure in which the footings constitute the sole contact with the land bottom and the vessel results in the total area of contact between the vessel and the land bottom being independent, within limits, of the outline area of the base structure and makes it possible to establish an optimum loading per square foot between the vessel and the land bottom. In accordance with the present invention, the area of the footings is selected to comprise the order of about 25% to 30% of the polygonal outline area defined by the stabilizing members, which is about 50% less than the same proportions of a lattice-type base structure with the same outline area. The decrease in contact area results in a higher bottom loading per square foot with the same static loading and the feature of providing stabilizing members and footings as independent force producing and transmitting means makes it possible to obtain a maximum bottom loading per square foot when desired. The concept of high bottom loading makes it possible to obtain a high order of ground stability and also makes it possible to practice a novel method described below which further improves ground stability, the latter being of particular importance when the vessel is submerged to land bottom of relatively poor bearing strength.

The high bottom loading improves ground stability by increasing friction between the vessel and the land bottom when the vessel is submerged to land bottom which possesses high load bearing strength greater than the maximum bottom loading that may be obtained. With respect to land bottom possessing less load bearing strength, the high loading per square foot obtainable between the bottom surfaces of the footings and the land bottom forces the footings into the land bottom so as to provide sockets in the land bottom which restrain lateral movement of the footings and hence the vessel. Although the perimeter of vertical contact between the footings and the land bottom is small relative to the outline area of the base structure, the depth of the footings provides a relatively large area of vertical contact with the ground bottom and a high resistance to horizontal shear forces is obtained. The quantity of ballast introduced into the stabilizing members should never exceed a value that would produce pressures forcing the footings so far into the land bottom as to move the members 162, 163, 164, 165, 166, and 167 into contact with the land bottom and stress the side trusses of the vessel in excess of designed limits. When the land bottom is hard, maximum ballast may ordinarily be introduced and maintained in the stabilizing members without the structural members of the base structure moving into contact with the land bottom while with land bottoms which may be more easily penetrated by the footings a value of ballast loading of the stabilizing members less than maximum would be appropriate. Also, with land bottom of relatively weak bearing strength, such as in delta areas, for example, the ballast loading of the stabilizing members may be so low that the structural members 162, 163, 164, 165, 166, and 167 of the base structure may be in contact with, and forced into, the land bottom under pressures not exceeding design limits of the vessel. In the latter case, the base structure, that is the footings 153, 154 and 155 and the structural members 162, 163, 164, 165, 166, and 167, function as a lattice-type base structure.

As indicated above, whether ballast is introduced into the stabilizing members to develop the maximum vertical static loading for a given depth of water or a value of static loading less than the maximum value depends upon the load bearing strength of the land bottom. Whenever the bearing strength of the land bottom is substantially greater than a critical value, the stabilizing members are ballasted to develop maximum vertical loading of the vessel; the critical value being the sum of the maximum static loading at the particular depth of submergence and the greatest anticipated cyclic loading. In such situations, a high order of ground stability may be easily obtained; however, difficulties are presented to the obtaining of the highest possible order of ground stability when the land bottom has a bearing strength greater than but close to the critical value, or less than the critical value, or when the bearing strength of the land bottom is unknown. The present invention provides a novel method which overcomes such difficulties. The novel method includes the steps of filling the ballast compartments of the stabilizing members to establish the highest possible static loading without failure of the land bottom. The highest possible static loading is referred to herein as the "preload" value and the footings may be preloaded one at a time. After the preloading is completed, ballast is removed from the stabilizing members to reduce the static loading to a "back-off" value. The "back-off" value of static loading will depend in part upon the "preload" value and upon the greatest anticipated cyclic load so that the total loading of the vessel will never exceed the "preload" value. Of course, the "back-off" value may be adjusted in accordance with varying cyclic loads due to changing conditions. During calm weather, the "preload" may be relieved to establish a relatively high "back-off" value; however, should storm conditions develop, the "back-off" value would be further decreased to compensate for resulting increases in cyclic loading.

The concept of preloading the vessel to the highest possible static loading followed by relieving the high static loading to establish a "back-off" value of static loading not only makes it possible to insure the maintaining of a high order of ground stability of the vessel regardless of the magnitude of cyclic loading that may arise but results in an increase of the load bearing strength of the land bottom. This result is of extreme importance when the land bottom possesses a low order of load bearing strength, such as, in an extreme case, when the load bearing strength of the land bottom is not substantially greater than the maximum anticipated cyclic loading. When ballast establishing the "preload" value is removed to in turn establish the "back-off" value of static loading, generally there exists no tendency of the footing to sink further into the land bottom and the soil beneath and around the footings which forms the sockets receiving the footings undergoes consolidation. As is known, after consolidation, the soil possesses higher load bearing strength and, as a result of soil consolidation, the land bottom will be capable of supporting loads greater than the "preload" value. The feature of preloading the vessel under conditions of high loading per square foot also increases the consolidation of the soil as the high pressure forces water from the soil under and around the footings and presses the particles of soil closer together increasing the friction of the soil. Also, the higher pressure due to preload disperses pockets of water beneath the footings within a shorter period of time relative to the time that would be required for such dispersal without preload. The dispersal of such pockets of water is essential in order to obtain the highest possible load bearing conditions and, when the land bottom possesses low bearing strength, it is important that the latter conditions be attained as quickly as possible. Furthermore, the effect of preloading forces the footings as deep as possible into the land bottom thus obtaining maximum resistance to horizontal shear forces against lateral movement as well as a further increase in the bearing strength of the land bottom by locating the bottom of the footings at a level below the surface of the land bottom where the bearing strength of the land bottom has a higher value. As noted above, the "back-off" value of static loading will vary depending upon the load bearing strength of the land bottom and upon anticipated cyclic loads. However, the "back-off" value of static loading should not whenever possible exceed a value which when combined with anticipated cyclic loads provides a total static loading will vary depending upon the load bearing bottom when considering the improved bearing strength of the land bottom obtained by the preloading and "back-off" operations described above as well as the extra load bearing capacity resulting from adhesion, cohesion and thixotropy. The highest order of ground stability is obtained when the highest permissible "back-off" value of static loading is maintained. It has been determined with regard to ground stability that preferably the cyclic loading should not exceed one-third the "back-off" value of static loading. In some locations, in severe weather conditions, it may be difficult to achieve this preferred relationship; however, the increased load bearing strength resulting from the preloading and "back-off" operations makes it possible to obtain the preferred result in situations where otherwise it would not be possible. Furthermore, the maintaining of the highest possible "back-off" value of static loading in combination with the concept of establishing a high loading per square foot between the footings and the land bottom further improves the ground stability when the vessel is subject to high cyclic loading. When a submerged vessel is subjected to cyclic loading the net loading in pounds per square foot between the vessel and the land bottom will swing about the value of static loading between maximum and minimum values differing from each other by a value equal to twice the cyclic loading and by maintaining the highest possible static loading the minimum net force will occur at the highest possible pressure. This results in the land bottom forming the sockets being subject to minimum disturbance such as due to hydrostatic pressure and the tendency of water seeping into the socket and forming pockets on the inner walls of the sockets.

When the load bearing strength of the land bottom is of a low value, it is usually possible to load the vessel so that the entire base structure, that is, the outer members 162, 163 and 164 as well as the inner members 165, 166 and 167 together with the footings move into contact with the land bottom without stressing the vessel structure beyond design limits. This results in increasing the area of contact between the vessel and the land bottom with a reduction in the loading per square foot which is advantageous when the land bottom possesses low bearing strength. Delta areas are an example of land bottom possessing extremely poor load bearing strength when this type of operation would take place. In delta areas, the land bottom possesses such a low order of load bearing strength the vessel actually floats in mud of a density greater than the density of water. According to the novel method of the present invention, the vessel is submerged in delta areas by preloading the vessel to submerge the vessel to the desired depth, in which case the entire base structure would be submerged into and below the mud bottom, and thereupon ballast is removed to provide a "back-off" value of static loading which is determined by considering factors including buoyancy of the mud and anticipated cyclic loading to establish and maintain equilibrium conditions in which thixotrophy effects aid in stabilizing the vessel. The preloading and back-off operations establish equilibrium conditions at any desired depth of submergence within a relatively short period of time thus making it possible to obtain vertical stability as soon as possible. It is understood, of course, the vessel may be preloaded under conditions with the entire base structure in contact with the land bottom when the land bottom possesses bearing strengths greater than that of delta areas and, while the maximum loading the vessel is designed to carry with the base members 162, 163, 164, 165, 166, and 167 in contact with the land bottom as bearing members is the limiting factor, it is to be understood the vessel may be submerged with the footings only in contact with the land bottom when the vertical loading of the vessel is less than the maximum design loading. When the vessel is submerged with the entire base structure in contact with the land bottom, such as mud, the ground stability of the vessel is obtained in a manner similar to vessels employing lattice-type grids as shown in FIGURES 7 and 8, for example. It will thus be apparent that the preloading and back-off operations may also be employed with the submersible vessel including lattice-type bases as described above providing the maximum preloading does not exceed a value that would cause structural failure of the vessel.

Since the required magnitude of the moments of inertia of the water plane areas of the stabilizing members decrease with submergence, it is possible to employ tapered stabilizing members with attendant savings in material. If desired, the taper of the stabilizing members may begin at some point above its bottom end while extending throughout a major portion of its length as shown in FIGURE 9. With the latter structure, maximum moments of inertia of the water plane areas are obtained throughout the initial phase of submergence.

The feature of the present invention of at least three stabilizing means located at the corners of a substantially polygonal stabilizing pattern in which the area defined by the cross-sectional outline of the stabilizing means is proportioned in accordance with the distance between the stabilizing means measured along the sides of the stabilizing pattern, provides a vessel submersible to great depths of water in which moments of inertia of the water plane areas of the stabilizing means are developed about any axis of heel of the vessel of magnitudes to establish the metacenter of the vessel with respect to the axis of heel above the center of gravity of the vessel during submergence and refloating operations with a minimum use of materials and without employing vertically movable pontoon structures. By providing at least three stabilizing means at the corners of stabilizing patterns in the form of substantially regular polygons, substantially equal moments of inertia of the water plane areas of the stabilizing means are developed about all axes of the vessel to establish substantially equal metacentric heights of the vessel with respect to any axis of heel and thus provide a vessel of inherently maximum stability for a given periphery. Furthermore, the features of at least three stabilizing means located at the corners of a substantially regular polygon makes it possible to provide a vessel designed for operation in great depths of water including a base structure providing adequate ground stability but of relatively low construction cost.

Submersible vessels including a stabilizing pattern in the shape of a substantially regular polygon and a stabilizing member located at each apex of the polygon are, irrespective of the number of stabilizing members, equivalent structures with respect to certain aspects and non-equivalent with respect to certain other aspects and, under certain circumstances, a structure including a predetermined number of stabilizing members, or a number of stabilizing members greater or less than a predetermined number, may be preferred. It can be shown mathematically that moments of inertia for structures having stabilizing patterns of substantially polygonal shape are equal when centers of the stabilizing members fall on circles of the same diameter and when the combined area of the cross-sectional outline of the stabilizing members of both structures are equal. Thus, with respect to floating stability, that is when the vessel is not resting upon the land bottom, the same stability is obtained irrespective of the number of stabilizing members providing at least three stabilizing members are employed. However, the condition of the land bottom, that is, whether the land bottom is hard or soft, and the magnitude of waves that may be encountered, that is, whether small or large, and combinations of these factors may dictate that a structure providing the greatest overall stability may be more economically obtained by employing a predetermined number of stabilizing members or a number of stabilizing members greater or less than a predetermined number.

As mentioned above, the stabilizing members and submerged portions of the vessels of each of the embodiments may be compartmented and means provided for introducing and removing ballast from the compartments. Suitable arrangements and equipment for such purpose are diagrammatically illustrated in FIGURE 7 wherein the member 107 includes bulkheads 130 and 131 forming therebetween a water ballast compartment 132 provided with a pump 133, having a valved inlet 134, for discharging ballast through conduit 135, and a pump 136, having a valved inlet 137, for introducing into the compartment water ballast from without the vessel. The stabilizing member 100 is of hollow construction forming a compartment 138 provided with a discharge pump 139 having a valved inlet 140 and a discharge conduit 141 and an inlet pump 142 discharging into the compartment and having a valved inlet 143 leading from without the vessel.

Although several embodiments of the invention have been disclosed and described above, it is to be expressly understood that various changes and substitutions may be made therein without departing from the spirit of the invention as well understood by those skilled in the art. Also, although the various forms of submersible vessels provided by the present invention have been described in the environment of off-shore drilling operations, it is to be expressly understood that submersible vessels embodying the principles of the present invention may be used for other submarine operations, such as for seismographic or geological operations employing slim hole rigs located at the apices of a vessel having the shape of any regular polygon. Furthermore, it is to be expressly understood that a vessel constructed in accordance with the principles of the present invention may be employed to perform submarine operations with the base structure submerged below the water but not to the land bottom. Reference therefor will be had to the appended claims for a definition of the limits of the invention.

What is claimed is:

1. A submersible vessel of unitary construction capable of being floated for movement to a location and then submerged comprising
   submersible base structure means,
   a working platform,
   supporting means connecting the working platform and the base structure means to support the working platform in spaced relation above the base structure means,
   a plurality of upstanding elements presenting the total water plane areas of the vessel upon submergence of the base structure means,
   at least a part of the plurality of upstanding elements comprising at least a part of the supporting means and extending upwardly from the base structure means,
   means for rigidly positioning the upstanding elements relative to the base structure means,
   the plurality of upstanding elements comprising a plurality of elongated stabilizing members each extending upwardly a predetermined effective height above the base structure means, the effective height being equal to the maximum depth of water to which the vessel is submersible,
   each elongated stabilizing member of the plurality of elongated stabilizing members presenting continuous external surfaces throughout the effective height thereof and being of appreciable cross-sectional area throughout the effective height thereof,
   each elongated stabilizing member of the plurality of elongated stabilizing members being located at an apex of a substantial polygon defining a stabilizing pattern, the substantial polygon having apices equal in number to the plurality of elongated stabilizing members,
   the displacement of the base structure means being sufficient to float the vessel with the base structure means having freeboard,
   the displacement of the base structure means and of the plurality of upstanding elements being sufficient to buoyantly support the vessel at any depth of submergence of the base structure means throughout the maximum depth of water to which the vessel is submersible,
   means for adding ballast to the vessel to submerge the base structure means,
   means for removing ballast from the vessel to float the vessel with the base structure means having freeboard,
   the moments of inertia of the total water plane areas of the vessel about any axis of heel of the vessel being of magnitudes to maintain the metacenter of the vessel with respect to the axis of heel above the center of gravity of the vessel at any depth of submergence of the base structure means throughout the maximum depth of water to which the vessel is submersible,
   the cross-sectional area of the plurality of elongated stabilizing members throughout the effective heights thereof being proportioned in accordance with the stabilizing pattern to establish moments of inertia of the water plane areas of the plurality of elongated stabilizing members about any axis of heel of the vessel upon submergence of the base structure means of magnitudes not substantially less than the magnitudes of the moments of inertia of the total water plane areas of the vessel about any axis of heel of the vessel upon submergence of the base structure means.

2. A submersible vessel as defined in claim 1 including means for forming ballast receiving compartments in the elongated stabilizing members and means for adding and removing ballast from the compartments.

3. A submersible vessel as defined in claim 1 including means for forming ballast receiving compartments in the base structure means and means for adding and removing ballast from the compartments.

4. A submersible vessel as defined in claim 1 including means for supporting the elongated stabilizing members outboard of the base structure means.

5. A submersible vessel as defined in claim 1 in which an elongated stabilizing member forms part of the supporting means.

6. A submersible vessel as defined in claim 1 comprising first connecting means forming part of the supporting means including a plurality of elongated lateral members joined to the stabilizing members adjacent their upper ends and interconnecting the stabilizing members the working platform being supported by the first connecing means,
and second connecting means including a plurality of elongated lateral members connected to the stabilizing members in vertically spaced relationship below the first connecting means and interconnecting the stabilizing members.

7. A submersible vessel as defined in claim 1 in which each of the stabilizing members includes a lower part and an upper part,
the lower part being of substantially uniform cross-sectional outline and the upper part having a cross-sectional outline less than the cross-sectional outline of the lower part.

8. A submersible vessel as defined in claim 1 in which the base structure means defines a pattern of substantially polygonal outline and in which each elongated stabilizing member of the plurality of elongated stabilizing members is joined to the base structure means at an apex of the substantially polygonal outline.

9. A submersible vessel as defined in claim 8 in which the base structure means defines a pattern of substantially square outline.

10. A submersible vessel as defined in claim 8 in which the base structure means defines a pattern of rectangular outline having a length greater than its width.

11. A submersible vessel as defined in claim 8 in which the base structure means defines a pattern of substantially triangular outline.

12. A submersible vessel as defined in claim 8 in which the plurality of upstanding elements includes a plurality of elongated structural members,
means for rigidly connecting the plurality of elongated structural members to the base structure means within the substantially polygonal outline defined by the base structure means,
the plurality of elongated stabilizing members and the plurality of elongated structural members presenting the total water plane area of the vessel upon submergence of the base structure means,
the area defined by the cross-sectional outline of the plurality of elongated structural members being small as compared to the area defined by the cross-sectional outline of the plurality of elongated stabilizing members throughout the effective heights thereof whereby the magnitudes of the moments of inertia of the water plane areas of the plurality of elongated stabilizing members are not substantially less than the magnitudes of the moments of inertia of the total water plane areas of the vessel by an amount equal to the magnitudes of the moments of inertia of the water plane areas of the plurality of elongated structural members.

13. A submersible vessel as defined in claim 8 in which the base structure means comprises a plurality of elongated members joined together at their ends to form a substantial polygonal frame,
in which each elongated estabilizing member of the plurality of elongated stabilizing members is joined to an apex of the polygonal frame,
and in which the platform is supported at least in part by the elongated stabilizing members.

14. A submersible vessel as defined in claim 8 in which the base structure means comprises a plurality of elongated members joined together at their ends to form a substantial polygonal frame,
in which each elongated stabilizing member of the plurality of elongated stabilizing members is joined to an apex of the polygonal frame,
in which the platform is supported at least in part by the elongated stabilizing members, and
a lattice structure within the frame comprising a plurality of elongated members joined to the frame.

15. A submersible vessel as defined in claim 8 in which the base structure means comprises a plurality of ground contact structures defining the pattern of substantially polygonal outline,
means for joining each ground contact structure of the plurality of ground contact structures to the lower end of an elongated stabilizing member,
the ground contact structures each comprising a top surface extending laterally from adjacent the lower end of respective elongated stabilizing members and a bottom surface spaced below the top surface and side walls joined to the top surface and the bottom surface,
and means for interconnecting the elongated stabilizing members adjacent the lower ends thereof,
the last-named means including lateral members extending between adjacent elongated stabilizing members and joined to the elongated stabilizing members at regions above the lower half of the side walls of the ground contact structures.

16. A submersible vessel as defined in claim 8 in which the base structure means comprises a plurality of ground contact structures defining the pattern of substantially polygonal outline,
means for joining each ground contact structure of the plurality of ground contact structures to the lower end of an elongated stabilizing member,
the ground contact structures each including a top surface joined adjacent the lower end of respective elongated stabilizing members and a bottom surface spaced below the top surface and side walls joined to the top surface and the bottom surface,
and means for interconnecting the elongated stabilizing members at their lower ends adjacent the top surfaces of the ground contact structures,
the last-named means including lateral members joined to the ground contact structures at regions above the lower half of the side walls of the ground contact structures.

17. A submersible vessel as defined in claim 16 including anti-skid means depending from the bottom surfaces of the ground contact structures.

References Cited by the Examiner

UNITED STATES PATENTS

| | | | |
|---|---|---|---|
| 720,998 | 2/1903 | Becker | 61—46.5 |
| 2,551,375 | 5/1951 | Hayward | 61—46.5 |
| 2,579,703 | 12/1951 | Rutledge et al. | 61—46.5 |
| 2,586,966 | 2/1952 | Kuss et al. | 61—46.5 X |
| 2,589,146 | 3/1952 | Samuelson | 61—46.5 |
| 2,591,599 | 4/1952 | Parks | 61—46.5 |

(Other references on following page)

UNITED STATES PATENTS

| | | | |
|---|---|---|---|
| 2,600,761 | 6/1952 | Haliburton | 61—46.5 |
| 2,667,038 | 1/1954 | Bayley | 61—46.5 |
| 2,857,744 | 10/1958 | Swiger et al. | 61—46.5 |
| 2,921,442 | 1/1960 | Laborde et al. | 61—46.5 |
| 2,938,352 | 5/1960 | Knapp et al. | 61—46.5 |
| 2,946,198 | 7/1960 | Knapp | 61—46.5 |
| 3,025,678 | 3/1962 | Dawson | 61—46.5 |
| 3,093,972 | 6/1963 | Ward | 61—46.5 |

OTHER REFERENCES

Oil & Gas Journal (publication) of June 11, 1956, page 92.

Oil & Gas Journal (publication) of June 9, 1958, pages 111—112.

CHARLES E. O'CONNELL, *Primary Examiner.*

JACOB SHAPIRO, *Examiner.*